US011222737B2

(12) United States Patent
Studer et al.

(10) Patent No.: US 11,222,737 B2
(45) Date of Patent: Jan. 11, 2022

(54) ELECTRIC CABLE

(71) Applicant: STUDER AERONAUTICAL AG, Däniken (CH)

(72) Inventors: Christoph Studer, Gretzenbach (CH); Geraldine Studer, Gretzenbach (CH)

(73) Assignee: STUDER AERONAUTICAL AG, Daniken (CH)

( * ) Notice: Subject to any disclaimer, the term of this patent is extended or adjusted under 35 U.S.C. 154(b) by 0 days.

(21) Appl. No.: 16/630,192

(22) PCT Filed: Jul. 10, 2018

(86) PCT No.: PCT/EP2018/068677
§ 371 (c)(1),
(2) Date: Jan. 10, 2020

(87) PCT Pub. No.: WO2019/011920
PCT Pub. Date: Jan. 17, 2019

(65) Prior Publication Data
US 2020/0168363 A1 May 28, 2020

(30) Foreign Application Priority Data

Jul. 14, 2017 (CH) .............................. 00924 / 2017

(51) Int. Cl.
*H01B 7/42* (2006.01)
*H01B 7/18* (2006.01)
(Continued)

(52) U.S. Cl.
CPC .............. *H01B 7/426* (2013.01); *H01B 7/184* (2013.01); *H01B 7/1875* (2013.01); *H01B 7/423* (2013.01);
(Continued)

(58) Field of Classification Search
CPC ........ H01B 7/184; H01B 7/185; H01B 7/324; H01B 7/326; H01B 7/426
See application file for complete search history.

(56) References Cited

U.S. PATENT DOCUMENTS

| | | | |
|---|---|---|---|
| 1,686,782 A | 10/1928 | Wodtke | |
| 6,631,095 B1 * | 10/2003 | Bryant | ................... H01B 7/045 367/20 |

(Continued)

FOREIGN PATENT DOCUMENTS

| | | |
|---|---|---|
| CN | 106098212 A | 11/2016 |
| DE | 10040601 A1 | 3/2002 |

(Continued)

OTHER PUBLICATIONS

Abstract of DE 100 40 601.
(Continued)

*Primary Examiner* — Paresh H Paghadal
(74) *Attorney, Agent, or Firm* — Brian Roffe

(57) ABSTRACT

An electric cable for supplying power to aircrafts, rail vehicles, motor vehicles, ships or other devices is a single or multi-conductor cable and includes one or more current conductors with at least one insulation. A single or multi-layer outer casing is distributed over the periphery and is associated with the outwardly protruding reinforcing elements. The reinforcing elements are in the form of cooling ribs protruding preferably over the entire periphery of the cable and enable the surface of the cable to be increased and as a result, improve heat dissipation. The projecting reinforcing elements considerably reduce the risk of burning when the current conductors heat up and also protect the cable against abrasion. The invention also relates to a plug for the electric cable.

21 Claims, 5 Drawing Sheets

(51) Int. Cl.
*H01B 9/00* (2006.01)
*H01R 13/66* (2006.01)
*H01B 9/04* (2006.01)

(52) U.S. Cl.
CPC ......... *H01B 9/005* (2013.01); *H01R 13/6683* (2013.01); *H01B 9/04* (2013.01)

(56) References Cited

U.S. PATENT DOCUMENTS

| | | | |
|---|---|---|---|
| 9,282,680 B2 | 3/2016 | Murphy et al. | |
| 10,049,790 B2 | 8/2018 | Studer | |
| 2001/0011602 A1* | 8/2001 | Vitolo | H01B 7/184 |
| | | | 174/117 R |
| 2002/0100604 A1* | 8/2002 | Spruell | H01B 7/282 |
| | | | 174/120 R |
| 2005/0167150 A1* | 8/2005 | Studer | H01B 9/003 |
| | | | 174/113 R |
| 2007/0240895 A1* | 10/2007 | Peterson | H02G 3/00 |
| | | | 174/72 A |
| 2010/0231228 A1* | 9/2010 | Koelblin | H01B 9/027 |
| | | | 324/544 |
| 2012/0082422 A1* | 4/2012 | Sarchi | G01K 11/32 |
| | | | 385/101 |
| 2014/0227909 A1 | 8/2014 | Kojima et al. | |
| 2014/0238968 A1* | 8/2014 | Lee | H05B 3/565 |
| | | | 219/209 |
| 2014/0345904 A1* | 11/2014 | Nagahashi | H01B 7/0009 |
| | | | 174/107 |
| 2014/0367140 A1* | 12/2014 | Abe | H01B 11/1834 |
| | | | 174/102 R |
| 2016/0107587 A1* | 4/2016 | Kasuya | H02G 3/0481 |
| | | | 174/72 A |
| 2018/0122533 A1* | 5/2018 | Varkey | H01B 7/046 |

FOREIGN PATENT DOCUMENTS

| | | |
|---|---|---|
| EP | 1308968 B1 | 5/2003 |
| ES | 2319618 T3 | 5/2009 |
| WO | 2019011920 A1 | 1/2019 |

OTHER PUBLICATIONS

Abstract of CN 106098212.
Abstract of ES 2319618.
Translation of Description and claims of DE 720060 C, published Apr. 23, 1942, Busch Jaeger Luedenscheid.

* cited by examiner

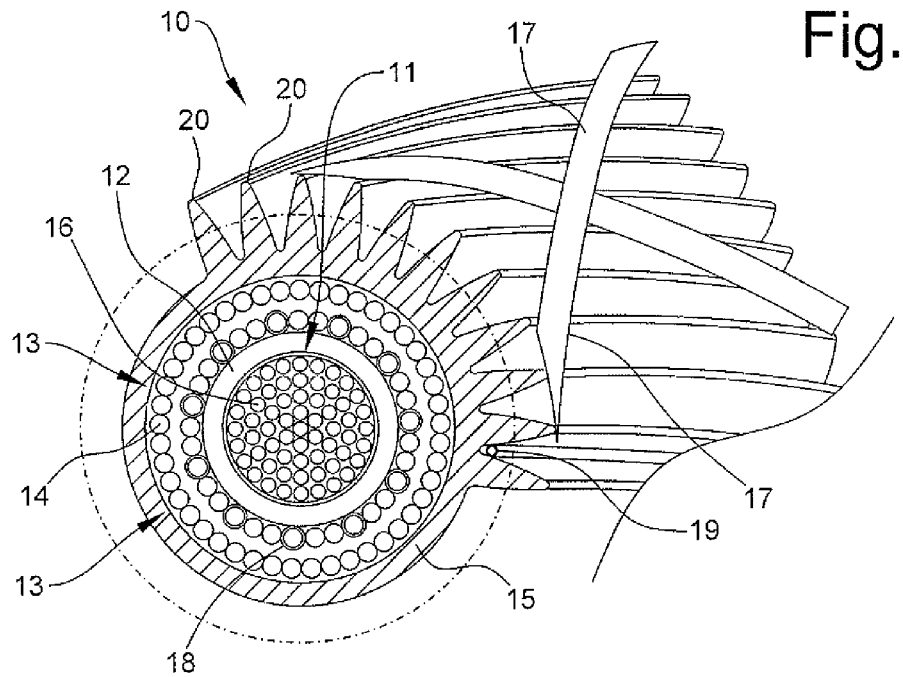
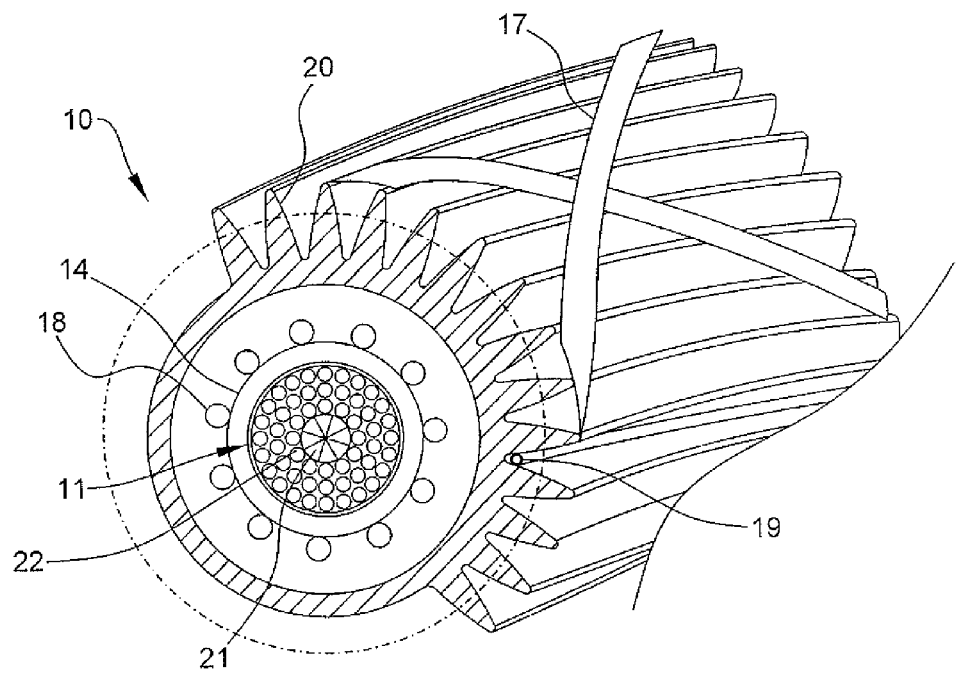

ELECTRIC CABLE

The invention relates to an electric cable for supplying power to aircrafts, rail vehicles, motor vehicles, ships or other devices, which is designed as a single or multi-conductor cable including one or more current conductors with at least one insulation layer as well as one single-layer or multi-layer outer casing.

BACKGROUND OF THE INVENTION

Such electric cables are used to supply electrical energy to aircrafts, rail vehicles, cars, motor vehicles or ships etc., which are preferably connected to a direct current or alternating current source. The supply serves for example to charge batteries and/or simultaneously supply the on-board electrical system. Normally, an alternating current voltage of 50 or 60 Hz is drawn from the mains power supply and then converted into the desired voltage waveform.

As a rule, the supply voltage in smaller aircrafts is 28 volts direct current, while in large passenger aircrafts or freighters, an alternating current voltage of 115 or 200 volts is provided at a frequency of 400 Hz or even higher frequencies.

Recently, in particular in military aircraft, increased supply voltages of 270 V direct current are used, which makes it easier to supply greater outputs but has negative consequences for operator protection and controlling short-circuits.

Known electric cables for charging batteries in aircrafts or the like are designed such that, with direct current voltage, either an individual cable as a positive and one as a negative conductor as the cheapest solution, each interconnected in sections, or better in electrical terms, if the positive is used as a pre-conductor and the negative as a return conductor, is used each alternately and twisted together split into two or more individual conductors. This structure results in a lower inductance per unit length and this is accompanied by a lower power loss with alternating current, but good transfer behaviour in respect of EMV, even if disruptions are superimposed. With direct current, two parallel untwisted individual conductors additionally have the displeasing property that ferrous parts are subjected to magnetisation. Better cables with small distances between positive and negative conductors achieve a small inductance due to twisting of same, and a uniform distribution of current to the individual parallel-connected individual conductors due to the symmetrical design. However, cables of this design also require correspondingly large copper cross-sections for correspondingly large currents, in order to limit the losses and drop in voltage.

FIELD OF THE INVENTION

If the voltage system is configured such that the outer layer of the vehicle or aircraft lies in the center between the positive and negative pole, then the central conductor is configured of 2 n positive and negative insulated conductors, and the concentric shield is attached to the earth. In this way in turn, operator protection can be guaranteed.

There are applications for transmitting larger load currents in which the limiting of temperature increases is solved such that a plurality of small tubes for circulating cooling liquid are passed through the inside of the cable, which small tubes remove heat from the cable and thereby prevent the cable temperature from exceeding predetermined values. This cooling of liquid is, however, an aggravating factor in respect of complexity, as well as production and maintenance costs of such cables.

Whenever possible, this therefore prevents conductive liquids, for example water, which is electrically conductive, and electricity from being guided into the same service cable. Because repeatedly drivable power units are used in the aviation sector, which power units are exposed to weather, such as frost, and vibrations, whenever possible liquids are dispensed with in the cable and cooling systems thereof, as they thus complicate the systems and have to be monitored for possible leakages.

OBJECTS AND SUMMARY OF THE INVENTION

The object of the invention is to improve an electric cable according to the type named at the outset such that, when subjected to optimum distribution of currents on the individual conductors, improved properties in respect of the production of a magnetic field with direct current, extensive prevention of overheating and improved operator protection when the outer casing has suffered damage, as well as a permanent improvement in terms of mechanical load, are achieved when using the cable.

This object is achieved according to the invention by a multi-conductor cable that includes a plurality of electric cables for supplying power, wherein each of the plurality of electric cables includes a central conductor, at least one insulation layer around the central conductor, a return conductor having a plurality of individual conductors twisted together and which is arranged concentrically around the at least one insulation layer, and an outer casing around the return conductor. The outer casing includes reinforcing elements projecting outwardly in a direction away from the return conductor and is situated over only a part of an outer circumference of the outer casing such that another part of the outer circumference of the outer casing does not have any reinforcing elements. The reinforcing elements are configured to increase heat conductibility of the electric cable. The another parts of the outer circumferences of the electric cables are in reciprocally contacting areas of the electric cables such that the outer casings of the electric cables are reciprocally in contact with one another.

Advantages of different types are achieved with these reinforcing elements allocated to the outer casing of the electric cable, which elements are distributed preferably over the whole circumference and project outwards.

Due to these reinforcing elements projecting preferably over the entire circumference of the cable being cooling ribs, an increase in the surface area of the cable, and consequently an improved heat transfer, is achieved, as the high output currents always lead to an above-average heat production.

These projecting reinforcing elements also serve to protect the cable against abrasion, i.e., when pulling the electric cable along the ground, initially not its outer casing, but firstly these reinforcing elements, become worn. Due to the low friction because of the smaller bearing surface, fuel outlay is also reduced if the cable has to be pulled over the ground.

Due to the lower heating of the electric cable, at least on the outside of the reinforcing elements, it is also ensured that, if the cable is contacted by ground staff or a user, the electric cable is not so hot immediately after use that the user can receive a burn.

The advantage of electric shock protection with greatly reduced risk of burns arises at the same time as the more pleasant feeling to the touch of a user in respect of thermal stress.

Generally speaking, these electric cables are pulled to the corresponding socket by ground staff or by users and inserted into same. Using the measure according to the invention, operator protection is substantially improved because the earth potential which leads to the outer body of the aircraft, car or motorcycle etc. is always contacted first in the event of damage. The user is thus protected in terms of potential.

BRIEF DESCRIPTION OF THE DRAWINGS

The invention and further advantages of same are explained in more detail below using embodiment examples, with reference to the drawings. These show, in:

FIG. 1 is an electric cable according to the invention shown in perspective view and in cross-section;

FIG. 2 shows a variant of the electric cable according to FIG. 1 shown in perspective view and in cross-section;

DETAILED DESCRIPTION OF THE INVENTION

Figure 3:
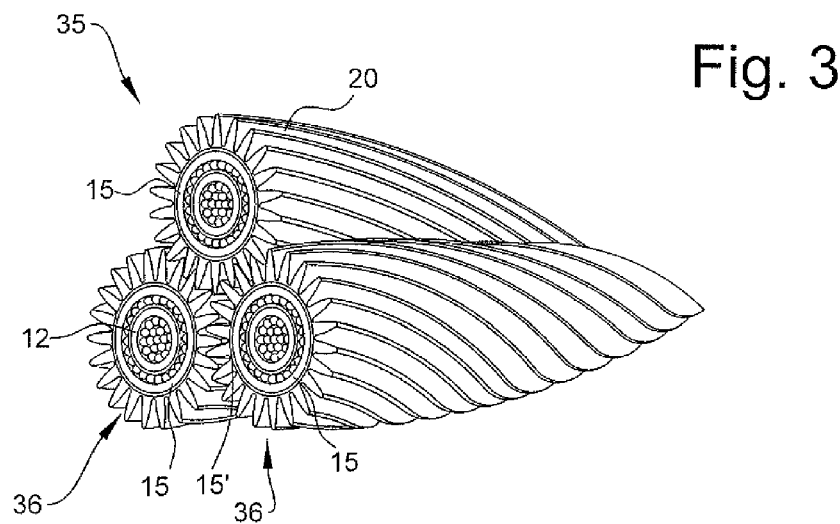
FIG. 3 shows an electric cable according to the invention shown as a twisted multi-conductor cable, in perspective view and in cross-section.

FIG. 1 shows an electric cable 10 which can be used in particular for supplying power to aircrafts, vehicles, ships or other devices. In operating state it is designed to be movable for connection to a respective socket of the aircraft. Advantageously, it can also be wound up or unwound from a coil.

The electric cable 10 is provided with a central conductor 11 with insulation 12 and a return conductor 13 made of a number of individual conductors 14 which are twisted together, which return conductor is arranged concentrically around the insulation. This return conductor 13 is dimensioned with an overall cross-section which corresponds approximately to that of the conductor 11 made of conductor wires 16. Additionally, an outer casing 15 is provided which is made of a single-layer or multilayer plastic.

This central conductor 11 and the return conductor 13 are produced from copper or aluminium or another material with good electrically conductive properties. The negative conductor wires 14 are arranged outside on the periphery like a concentric shield, whereas the positive individual conductors 16 are guided inwards, preferably with double insulation 12.

If higher frequencies are transferred or high-frequency compensating currents are conducted with this electric cable 10, the central conductor wires 16 and the concentric shield or protective conductor wires must be insulated from one another because of the skin effect by individual or bundle insulations over a plurality of smaller conductors, meaning that there is a larger conductor surface.

A plurality of control chargers 18 are embedded between the individual conductors 14 as control and/or dummy cores in the return conductor 13 surrounding the conductor 11 concentrically, which control chargers are used for control and/or monitoring purposes. These dummy cores 18 are preferably entrained insulated in the outer layer, and have only a small difference in voltage from the negative conductor attached to ground. They can also be twisted in pairs and embedded such that a lower sensitivity to electromagnetic interference fields is achieved.

These outer individual conductors 14 are connected to the outer body (ground) of the aircraft and can be earthed, depending on the configuration. This corresponds to a shielding attached to ground, and serves both for optimizing EMV and also for operator protection, which is substantially improved by this arrangement because, in the event of any damage to the cable casing, initially contact is made with the ground potential of the body of the aircraft, car or motorcycle etc. These individual conductors 14 are generally designed as negative conductors, since generally the ground is also connected to the negative potential.

The central conductor 11 could also have a slightly larger cross-section than the return conductor 13 in order that the stronger heating can be compensated in the conductor 11 for a uniform symmetrical drop in voltage to be achieved.

According to the invention, reinforcing elements 20 projecting outwards, distributed preferably over the entire circumference, are allocated to the outer casing 15, as a result of which an outer surface is formed, which is enlarged vis-à-vis the cylindrical outer casing, for the purpose of increasing the heat conductibility of electric cable 10.

Advantageously, the reinforcing elements 20 projecting in outer casing 15 are designed as longitudinal lamellae protruding away from this casing in a star shape, extending over the entire length of the electric cable in a helical shape or a meandering shape. These longitudinal lamellae are provided V-shaped or with another cross-section, and sufficiently large for their surfaces to be able to conduct heat sufficiently. Instead of being V-shaped, they can also be rectangular, mushroom-shaped or similar.

In the reinforcing elements 20, the electric cable 10 preferably has additional external strips 17 or the like wrapped around its outside. These helical external strips 17 travelling in helical rows and attached to the tips 20' of the longitudinal lamellae are arranged at a distance from one another. The abrasion of the longitudinal lamellae is intended to be reduced by the support and reinforcement, and compressing of same prevented. In particular this relates to the longitudinal lamellae which are attached from below to the ground. Therefore, these external strips 17 are made from a material which is resistant to abrasion, and contain for example polyamide or HDPE constituents.

Preferably, graphite and/or metal additions are contained, uniformly distributed, in the outer casing 15 made of plastic and the reinforcing elements 20, in order to increase thermal conductivity.

Additionally, the at least one insulation 12 and/or the outer casing 15 can each be constructed from a plastic produced by cross-linking for thermally increased loading capacity.

Furthermore, an optical fiber 19, visible from the outside, is guided preferably between two reinforcing elements 20, in order to make operating states, operating information and/or the electric cable visible in the dark. Self-evidently, depending on the application, two or more for example opposing optical fibers 19 can also be provided.

FIG. 2 shows an electric cable 10' which is per se designed identical to that of FIG. 1 and is therefore not explained in more detail. The only difference is a hose assembly 21 embedded in the center of the conductor 11' in order to cool the electric cable with a medium, preferably air, pumped therethrough. This hose assembly 21 is reinforced with internal links 22 and is connected at one end to a pump in the electric cable 10'. Self-evidently, if necessary, a plurality of such hose assemblies 21 can also be embedded in the electric cable.

The layer with the reinforcing elements or cooling ribs can be attached, subsequently, to the finished cable also in the form of a shrink-on tube. This shrink-on tube can be provided with or without adhesive and is attached there, where additional cooling by improved heat dissipation is desirable.

These reinforcing elements 20 can be provided only as cooling ribs or also for non-thermal increase of the surface, where they serve only a mechanical protection function and to reduce frictional forces. In this case, the outer surfaces of the reinforcing elements 20, in particular at the tips 20', are formed from a single-layer or preferably multilayer sheet of different colors in order, as a result, to display visually the wear strength of the electric cable.

These reinforcing elements 20 are not shown over the entire circumference in FIG. 1 or FIG. 2, wherein, however, advantageously these should be provided all around, as is apparent in FIG. 3.

FIG. 3 shows a multi-conductor cable 35 with individual electric cables 36, each of which is developed per se the same as those of FIG. 1, and therefore only the differences are explained below. These three individual electric cables 36 are advantageously twisted together, and each has reinforcing elements 20 only over a part of the outer circumference. The reinforcing elements 20 are omitted in the reciprocally contacting area 15' of these electric cables 36, whereby these electric cables 36 are reciprocally in contact with their outer casings 15. This has the advantage that the multi-conductor cable 35 formed therefrom can be dimensioned with a smaller outer diameter than if the individual electric cables 36 were to have reinforcing elements 20 all around.

In principle, however, the individual electric cables could also be designed like those of FIG. 1 and accordingly be provided with these reinforcing elements 20 all around.

Figure 4:
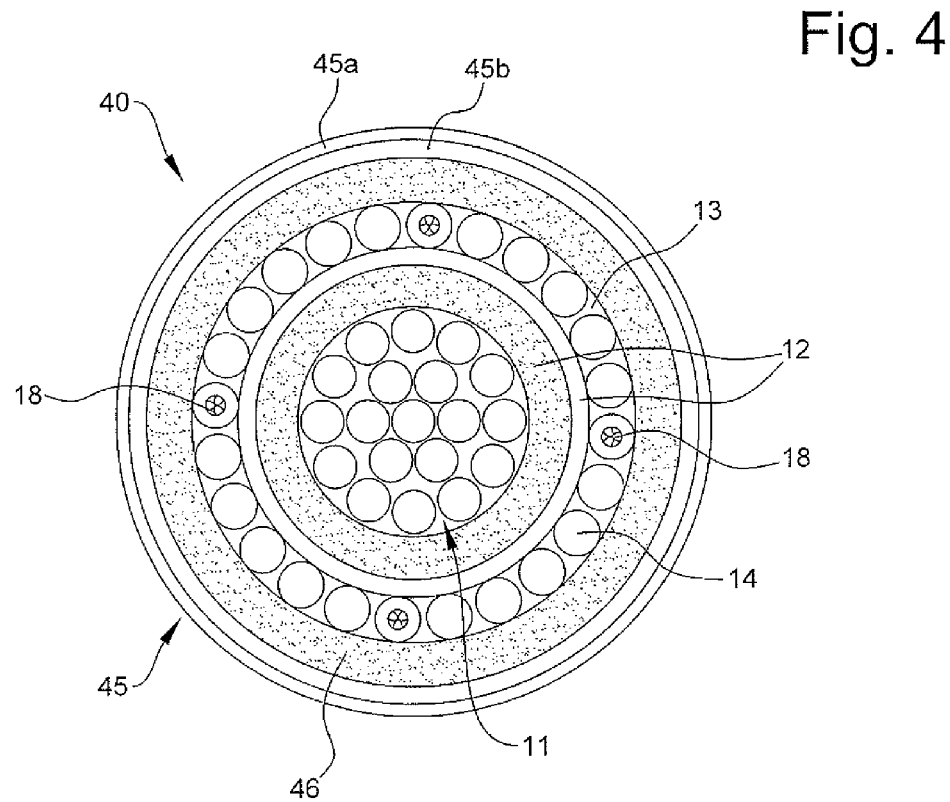
FIG. 4 shows a variant of an electric cable shown in cross-section.

In the electric cable 40 according to FIG. 4, instead of these reinforcing elements 20 which project outwards, a multilayer outer casing 45 is provided with a cylindrical outer surface. Within the scope of the invention, this outer casing 45 is in turn preferably composed of two layers, specifically of an outer layer 45a made of a thermally conductive plastic and an inner layer 45b which can be produced from different types of materials, as well as of a further layer 46 which can be produced from a PCM material.

Otherwise, this electric cable 40 is developed similarly to that of FIG. 1. It has a conductor 11, a return conductor 13, concentrically surrounding same, with individual conductors 14 and the outer casing 45. Moreover, a multilayer thick insulation 12 is provided between the conductor 11 and the return conductor 13, which insulator reliably insulates the positive conductor vis-à-vis the shield or protective return conductor.

The cold store 46 extending over the length of the cable, for example made of a PCM granulate, which cold store can absorb a large quantity of heat within a short period of time, makes it possible for the electric cable to be able to equalize thermal loads during use.

Layers 45a, 45b of the outer casing 45 can likewise be formed from a single-layer or multilayer sheet of different colors in order, as a result, to display visually the wear strength of the electric cable.

Advantageously, at least one sensor is integrated into at least one conductor 18 or the plug at the end of the cable for the purpose of measuring temperature, which is not shown in more detail. The power supply of the electric cable can be controlled, by means of this temperature which can be measured during charging, such that an established maximum temperature in the electric cable or in the start and/or end side plug is not exceeded.

A wire-shaped sensor for determining heat can also be integrated which extends over the length of the cable, by means of which sensor the electricity supply can be regulated analogously or temporarily switched off.

Alternatively, a start and/or end side plug with an integrated temperature switch is connected at one end, through which connector the power supply would be reduced when a limit temperature is exceeded.

Additionally, the risk of too strong a magnetic field being produced can be prevented vis-à-vis the solution with two individual cables for direct current transmission, which magnetic field could lead to a magnetisation of the adjacent iron parts in sections, concrete reinforcement or the like.

Figure 5:
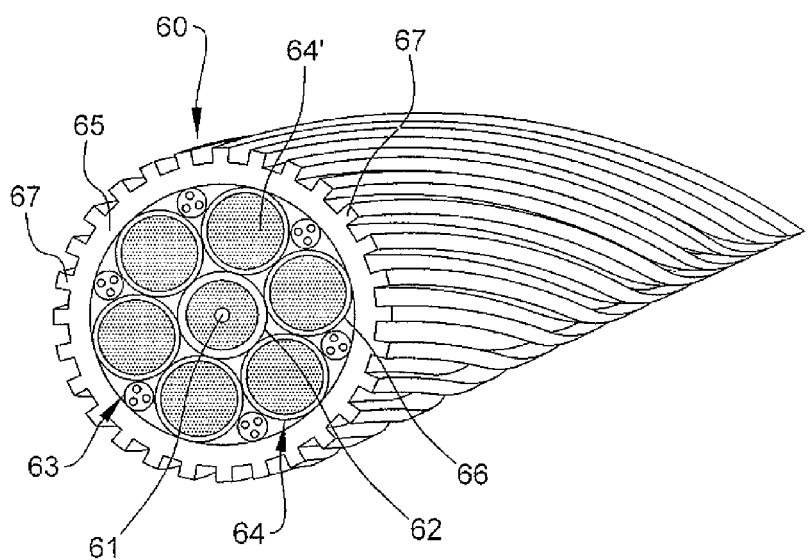
FIG. 5 shows an electric cable, shown in perspective view and in cross-section, as a variant for frequencies of 400 Hz.

FIG. 5 shows an electric cable 60 which is suitable for application at a high frequency, such as 400 Hz. It is formed with one or more central conductors 61, each with insulation 62, and conductors arranged concentrically about same, consisting of a number of individual conductors 64 twisted about the central conductor, each of which is formed from a number of corded wires 64' and insulation 66. Additionally, wedge conductors 63 of individual conductors are provided between the return conductors, which wedge conductors can be used for measuring, control and/or regulating purposes. These individual conductors 64 and wedge conductors 63 are surrounded by a single-layer or multilayer outer casing 65.

According to the invention, reinforcing elements 67 distributed over the whole circumference and projecting outwards are allocated to the outer casing 65, which elements each have an approximately rectangular shape in cross-section. The thermal behaviour is optimized and a reduction in frictional forces is achieved with these reinforcing elements 67 designed as cooling and reinforcing ribs. Advantageously, these reinforcing elements 67 run about the electric cable in a helical shape or a meandering shape.

Figure 6:
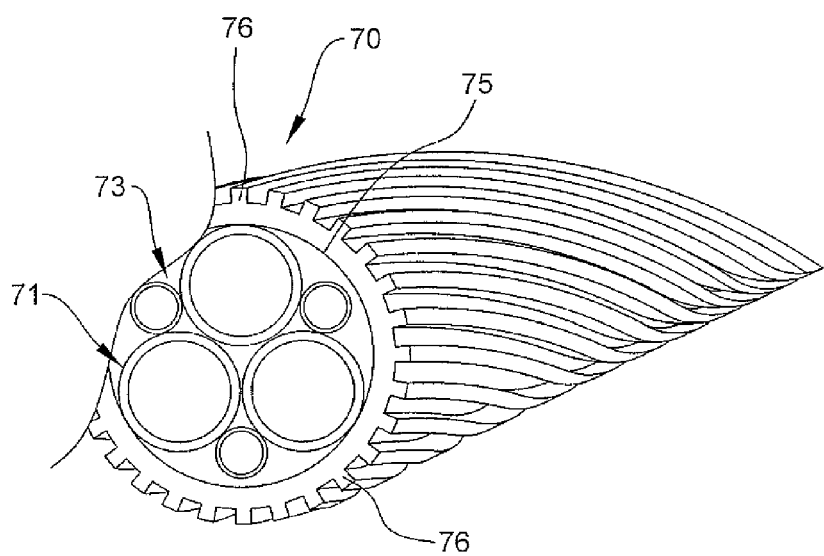
FIG. 6 is an electric cable shown in perspective view and in cross-section as a typical drive cable.

FIG. 6 shows an electric cable 70 which typically is used as a motor cable or supply cable and is produced as a multi-conductor cable with individual electric cables 71, similar to multi-conductor cable 35. Therefore, only the differences from this will be displayed. With electric cables 71, there is still twisting outside between these wedge conductors 73 or similar. The outer casing 75 surrounds the three electric cables 71 and the wedge conductors 73 in tubular manner.

According to the invention, reinforcing elements 76, distributed advantageously over the entire circumference and projecting outwards, are allocated to the outer casing 75, which elements each have an approximately rectangular shape in cross-section. In this way, these reinforcing elements 76 are developed similar to those in electric cable 60 of FIG. 5 and produce the same advantages in terms of heat and friction.

Figure 7:
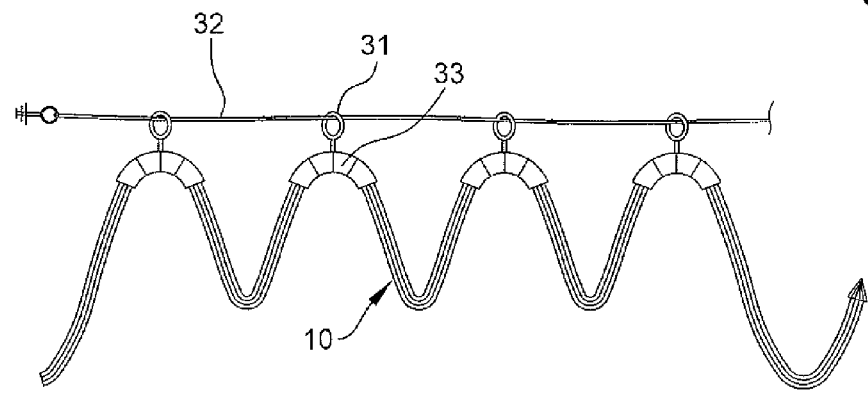
FIG. 7 is a schematic view of an electric cable hung by supporting means.

According to FIG. 7, the electric cable 10 can be hung on a longitudinal element 32 to be guided in the air with supporting means 31, to move the electric cable for connection to a socket in the aircraft etc. This helps to improve cooling and reduce wear. A plurality of such supporting means 31, spaced apart from one another, are fixed to the electric cable 10 by brackets 33 and held in longitudinally displaceable manner on the longitudinal element 32. No external strips are required in the electric cable 10 in this application.

Figure 8:
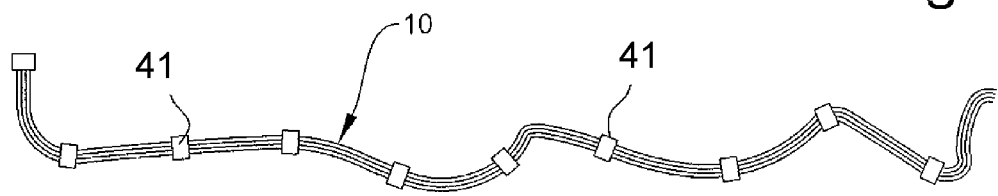
FIG. 8 is a schematic view of an electric cable equipped with guide elements for guiding along the ground.

FIG. 8 shows a variant in which the electric cable 10 is provided with guide elements 41, such as for example with rigid plastic sliding rings, to be guided along the ground to move the electric cable for connection to a socket in the aircraft etc. Guide elements 41 could also be stored on the underside, on rollers.

Figure 9:
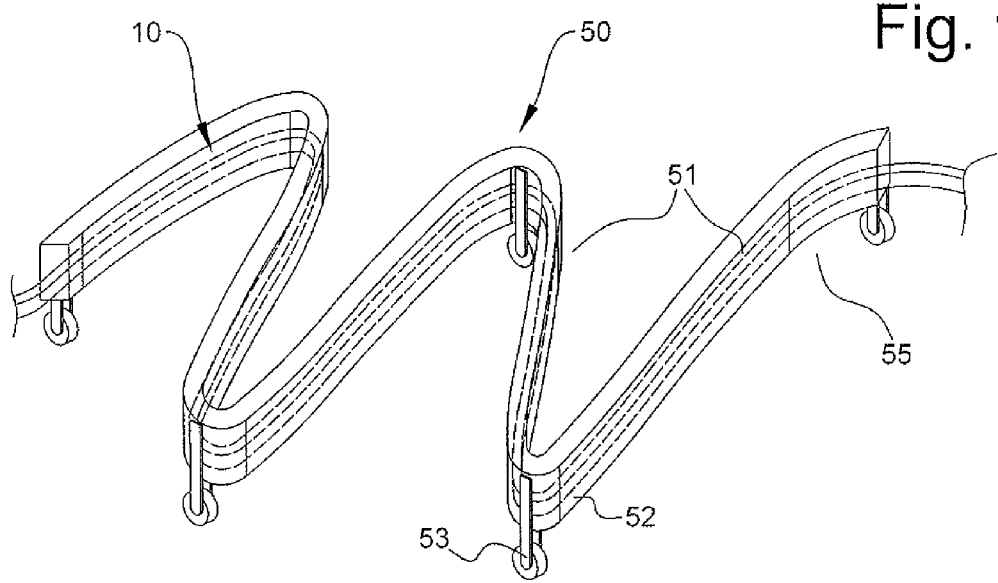
FIG. 9 is a schematic view of a holding device which can be moved along the ground with an integrated electric cable.

According to FIG. 9, electric cable 10 is inserted into a longitudinal holding device 50 which can be moved on a ground 55 or in the air in the manner of a snake, and in order for the cable likewise to be able to be displaced from a retracted position into a charging position, and vice versa. This holding device 50 consists of a box-shaped longitudinal housing 51 with flexible mechanical joints 52 and rollers 53 housed on the underside of same, through which rollers the longitudinal housing 51 can be moved along the ground 55 with little effort. This longitudinal housing 51 could also be ventilated in order to cool the electric cable 10 additionally, or the walls of the longitudinal housing could also be perforated in order to allow air to pass through.

Figure 10:
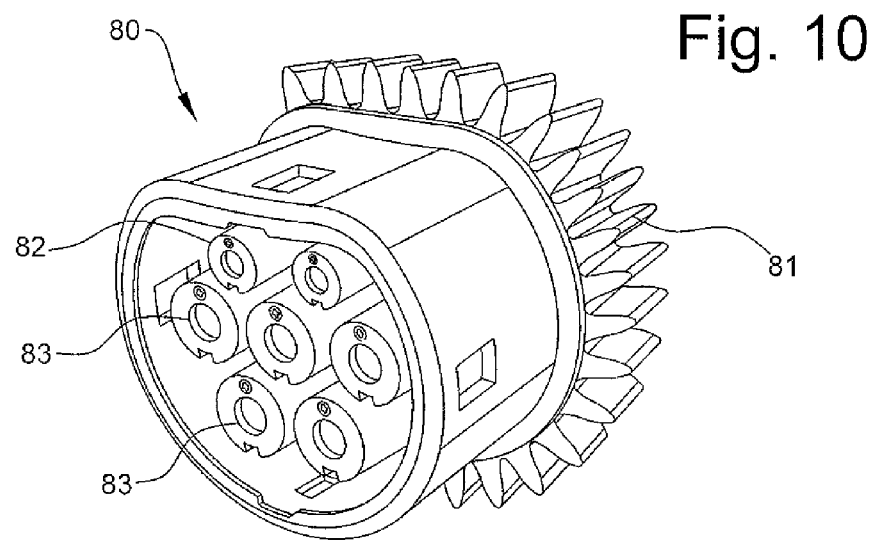
FIG. 10 is a front view of a plug according to the invention for an electric cable.
Figure 11:
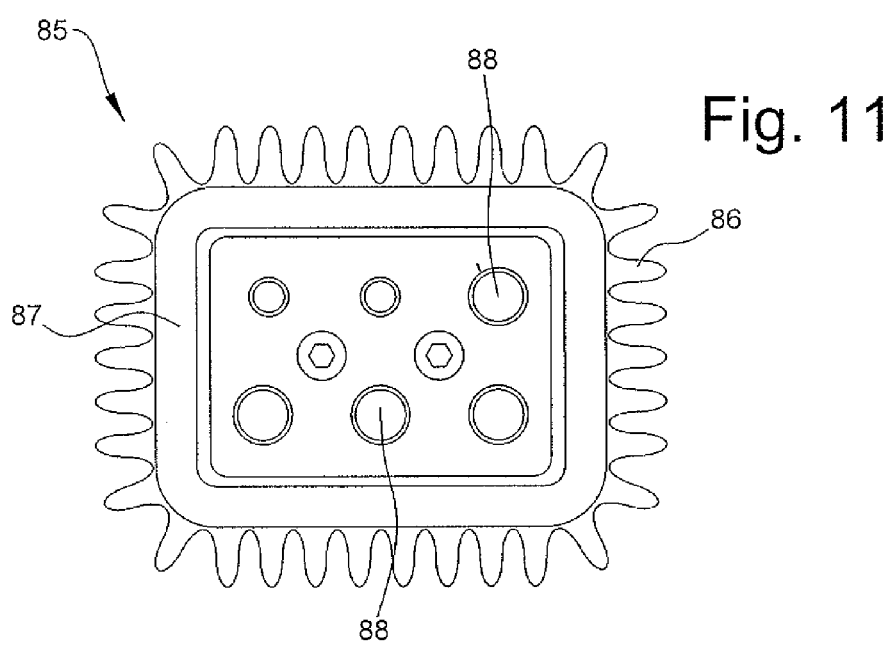
FIG. 11 is a perspective view of a variant of a plug according to the invention for an electric cable, in particular for aircrafts.

FIG. 10 and FIG. 11 each show a plug 80, 85 for an electric cable according to the invention according to FIG. 1 to FIG. 6. On the outside of its housing 82, 87 this respective plug 80, 85 is designed, as in the electric cable 10, 10', with such reinforcing elements 81, 86 with ribbed structure projecting outwards, in order that the rigidity in the plug is increased. These reinforcing elements 81, 86 are arranged projecting over a specific length to the respective housing 82, 87, wherein the housing part which can be inserted into the socket with the individual plugs 83, 88 is self-evidently provided without these reinforcing elements.

The result of these reinforcing elements 81, 85 additionally acting as cooling ribs is that the contact temperature at the ribs is likewise clearly lower than in a plug without cooling amplification. It is thus possible to prevent the user from suffering a burn.

These reinforcing elements 81, 86 can alternatively be produced from a relatively soft rubbery material. The damping effect is thus increased if the plug for example falls onto the ground. The inside of the plug is preferably cast in order to achieve the best possible thermal conductivity from contact to surface.

The invention is displayed sufficiently using the above embodiment examples. It could, however, self-evidently be illustrated using other variants. In this way, a plurality of current conductors, wound towards one another for example like a cable, can be contained inside the cable.

The invention claimed is:

1. A multi-conductor cable, comprising:
   a plurality of electric cables for supplying power, each of the plurality of electric cables comprising:
      a central conductor;
      at least one insulation layer around the central conductor;
      a return conductor comprising a plurality of individual conductors twisted together, the return conductor being arranged concentrically around the at least one insulation layer; and
      an outer casing around the return conductor, the outer casing including reinforcing elements projecting outwardly in a direction away from the return conductor and being situated over only a part of an outer circumference of the outer casing such that another part of the outer circumference of the outer casing does not have any reinforcing elements, the reinforcing elements extend along a length of the electric cable in a helical shape or a meandering shape,
   the another parts of the outer circumferences of the electric cables being in reciprocally contacting areas of the electric cables such that the outer casings of the electric cables are reciprocally in contact with one another.

2. The multi-conductor cable according to claim 1, wherein the reinforcing elements are configured to increase heat conductibility of the multi-conductor cable.

3. The multi-conductor cable according to claim 1, further comprising external strips wrapped around the reinforcing elements.

4. The multi-conductor cable according to claim 1, further comprising graphite and/or metal additions contained in plastic of the outer casing in order to increase thermal conductivity.

5. The multi-conductor cable according to claim 1, wherein the at least one insulation layer and/or the outer casing are each constructed from a plastic produced by cross-linking for thermally increased loading capacity.

6. The multi-conductor cable according to claim 1, wherein the return conductor further comprises blanks that insulate the individual conductors, the return conductor having an overall cross-section which corresponds approximately to that of the central conductor made of conductor wires insulated by the blanks.

7. The multi-conductor cable according to claim 1, wherein outer surfaces of the reinforcing elements are formed from a single-layer or multilayer sheet of different colors.

8. The multi-conductor cable according to claim 1, wherein a cold store extending over the length of the electric cable, is contained therein, which cold store absorbs and stores a large quantity of heat within a short period of time, in order that the electric cable equalizes thermal loads during use.

9. The multi-conductor cable according to claim 1, further comprising at least one hose assembly embedded, in the electric cable in order to cool the electric cable with a medium pumped therethrough.

10. The multi-conductor cable according to claim 1, further comprising at least one optical fiber between two of the reinforcing elements.

11. The multi-conductor cable according to claim 1, further comprising at least one sensor for measuring temperature.

12. The multi-conductor cable according to claim 1, further comprising a wire-shaped sensor which extends over the length of the electric cable to determine heat.

13. An assembly comprising the multi-conductor cable according to claim 1 and a plug with an integrated temperature switch through which a supply of power is reduced when a limit temperature is exceeded.

14. The multi-conductor cable according to claim 1, further comprising controlling chargers, concentrically surrounding the central conductor embedded in the return conductor, which controlling chargers are used for control and/or monitoring purposes.

15. The multi-conductor cable according to claim 1, further comprising:
   supports spaced apart from one another in a longitudinal direction of the electric cable; and
   brackets that fix the supports to the electric cable to enable the electric cable to hang from a longitudinal element and to move along the longitudinal element in the longitudinal direction.

16. An assembly comprising the multi-conductor cable according to claim 1 and guide elements or a holding device that engage with the electric cable and enable the electric cable to move.

17. The multi-conductor cable according to claim 1, wherein the electric cables are twisted together.

18. The multi-conductor cable according to claim 17, wherein the at least one insulation layer and the outer casing are extruded from heat-resistant or flexible plastic sheets.

19. A plug for the electric cable according to claim 1, with a housing, further comprising reinforcing elements with a rib-type structure arranged projecting outwards on the outside of the housing, wherein the housing part inserted into the socket is designed with individual plug without these reinforcing elements.

20. The plug according to claim 19, further comprising at least one sensor integrated to measure temperature, by means of which the power supply is regulated to limit a maximum temperature in the electric cable.

21. The multi-conductor cable according to claim 1, wherein the reinforcing elements have a cross-section which is an inverted V-shaped.

* * * * *